(12) United States Patent
Mi

(10) Patent No.: US 6,972,827 B2
(45) Date of Patent: Dec. 6, 2005

(54) TRANSFLECTIVE FILM AND DISPLAY

(75) Inventor: Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 11 days.

(21) Appl. No.: 10/742,383

(22) Filed: Dec. 19, 2003

(65) Prior Publication Data

US 2005/0134769 A1    Jun. 23, 2005

(51) Int. Cl.⁷ .................................................. G02F 1/13
(52) U.S. Cl. ...................... 349/200; 349/114; 349/201
(58) Field of Search .............................. 349/200–201, 349/114, 158; 362/618–620

(56) References Cited

U.S. PATENT DOCUMENTS

| | | | |
|---|---|---|---|
| 4,729,640 A * | 3/1988 | Sakata ......................... | 349/201 |
| 5,299,037 A * | 3/1994 | Sakata ........................... | 349/1 |
| 5,477,351 A | 12/1995 | Takahara et al. | |
| 5,486,940 A * | 1/1996 | Fergason et al. ............. | 349/122 |
| 5,648,859 A * | 7/1997 | Hirabayashi et al. .......... | 349/9 |
| 6,292,240 B1 | 9/2001 | Kamiya et al. | |
| 6,473,220 B1 | 10/2002 | Clikeman et al. | |

\* cited by examiner

Primary Examiner—Dung T. Nguyen
Assistant Examiner—Phu Vu
(74) Attorney, Agent, or Firm—Arthur E. Kluegel

(57) ABSTRACT

A transflective optical film reflects ambient light incident on the first surface and transmits light having a preferred polarization state incident on the opposite surface. The film has a substrate wherein a plurality of tapered cavities extends from a first surface of the substrate toward an opposite surface, the tapered cavities narrowing toward the opposite surface, and a filler material deposited within each the tapered cavity. A reflective layer is deposited on the filler material in each tapered cavity, along the first surface of the substrate. At least one of the substrate and the filler material is birefringent such that for a preferred polarization state, the refractive index of the filler is substantially lower than the refractive index of the substrate and that, for the polarization state orthogonal to the preferred polarization state, the refractive index of the filler is substantially the same as the refractive index of the substrate.

31 Claims, 5 Drawing Sheets

TRANSFLECTIVE FILM AND DISPLAY

FIELD OF THE INVENTION

This invention generally relates to a transflective optical film and more particularly relates to a transflective optical film for reflecting light having both polarizations incident on one surface and for transmitting one polarization and reflecting the other polarization incident on the opposite surface.

BACKGROUND OF THE INVENTION

Liquid Crystal Devices (LCDs) are employed in a wide range of display applications including laptop computers, instrumentation, and mobile and handheld computation and communication devices. While LCDs offer many advantages over other types of spatial light modulators, one well-known drawback of these devices relates to brightness. LCDs depend on externally supplied light, which may be provided from a backlight arrangement or, for some types of devices, from ambient light that is reflected back through the LCD.

One strategy used for maximizing display brightness is to use both ambient light and backlighting by employing a transflective film or surface. This type of surface is configured to allow transmission of light from a backlighting apparatus as well as reflection of ambient light, effectively increasing the overall luminance available for modulation by the LCD. One conventional type of transflective surface is a half mirror, commercially available from a number of LCD display suppliers. Referring to FIG. 1, there is shown an LCD display configuration 100 using a half mirror as a transflective surface 1. A liquid crystal (LC) layer 53 is sandwiched between two glass plates 52 and 54 and provided with polarizers 50a and 50b. FIG. 1 provides a useful illustration of each illumination mode, as follows:

(a) For transmissive mode, a light source 72 provides light to a light providing surface 70, which cooperates with reflective surface 74 to diffuse light and provide backlight 110, which is transmitted through transflective surface 1. Rear polarizer 50b transmits that portion of backlight 110 having the preferred polarization state, which is then modulated by LC layer 53, passes through front polarizer 50a and emerges as a modulated light 111.

(b) For reflective mode, ambient light 113 having the preferred polarization state passes through front polarizer 50a, LC layer 53, and rear polarizer 50b as a polarized light 114. Transflective surface 1 then reflects this ambient light back through rear polarizer 50b. LC layer 53 modulates this reflected ambient light and directs it through front polarizer 50a as a modulated light 115.

Ideally, the sum of modulated light 111 plus modulated light 115 provides a noticeable amount of added luminance to the display. In practice, however, only a small amount of additional luminance is obtained using a half mirror as transflective surface 1.

Another conventional approach segments the surface area of the LCD pixel itself into reflective and transmissive regions, as is disclosed in U.S. Pat. No. 6,295,109 (Kubo et al.) and U.S. Pat. No. 6,532,045 (Chung et al.). However, this approach requires considerably more complex LCD and device driver design. Moreover, by effectively reducing the available aperture in each light path, this approach compromises the effectiveness of using reflective and transmissive sources.

One approach, as disclosed in U.S. Pat. No. 6,285,422 (Maeda et al.) is to provide a transflective element for operation in either reflective or transmissive mode, but not both at the same time, depending on the available light source. With such a method, the behavior of the transflective display can be optimized for light incident from either direction. However, this type of approach does not offer the benefit of added luminance over either transmitted or reflected light.

Other attempts to boost luminance are directed to the design of various configurations of transflective films. For example, U.S. Pat. No. 6,473,220 (Clikeman et al.) discloses, for uses such as a replacement for the conventional half mirror, a transflective film having a set of reflective indentations of various possible shape. In the embodiment described in the Clikeman et al. '220 disclosure, these indentations are filled with reflective material. The transflective film of the Clikeman et al. '220 disclosure is, then, a film having a number of embedded reflective structures. Ambient light is reflected from that part of each reflective structure that is parallel to the surface of this film; transmitted light is directed past and around each of the reflective structures. As a result, light efficiency is increased by the transflective film of the Clikeman '220 disclosure, boosting the available luminance by adding a substantial percentage of the incident ambient light to a substantial portion of the transmitted light. However, there are a number of drawbacks to this approach. The film fabricated according to the Clikeman et al. '220 disclosure somewhat reduces transmitted light in order to use reflected light. While some compromise is inevitable, it would be desirable to boost this transmitted light as much as possible. A more significant shortcoming of this approach, however, relates to polarization effects. Because the LCD modulates light having a preferred polarization state, only a portion of the ambient or transmitted light can be modulated. Light having the wrong polarization state does not contribute to the overall level of modulated light; instead, light of the wrong polarization state must be blocked from the path of modulated light in order to provide a suitable contrast level. Certainly, a transflective film fabricated using the approach of the Clikeman et al. '220 disclosure may be of particular value for backlighting applications in which polarization of light is not a consideration or for use in solar energy collection applications. However, this type of film is not optimized for LCD display applications where polarized light is modulated.

Another approach for transflective film, more aptly suited for handling polarized light than the film of the Clikeman et al. '220 disclosure, employs a reflective polarizer and diffuser, as disclosed in U.S. Pat. Nos. 6,124,971 and 6,262,842 (both to Ouderkirk et al.) These patents describe a number of possible embodiments using a reflective polarizer as a transflective component. While there are some advantages offered by this approach, there are also a number of shortcomings that limit its effectiveness. Due to characteristics of the reflective polarizer itself, there can be an undesirable amount of light leakage in transmissive or reflective mode. In the design of a suitable reflective polarizer, some compromise is required, which reduces performance in either transmissive or reflective modes.

Thus it can be seen that there is a need for a transflective film that is well suited to the demands of LCD displays and that handles polarized light efficiently to enable increased luminance.

SUMMARY OF THE INVENTION

The invention provides a transflective optical film for reflecting ambient light incident on a first surface and for transmitting light having a preferred polarization state incident on a second surface opposite the first surface, the optical film comprising:
  (a) a substrate containing a plurality of tapered cavities extending from the first surface of said substrate toward the second surface opposite the first surface, said tapered cavities narrowing toward said second surface;
  (b) a filler material deposited within each said tapered cavity; and,
  (c) a reflective material deposited on said filler material on the surface of the filler material adjacent the first surface of said substrate;

wherein at least one of said substrate and said filler material is birefringent such that:
  (a) for said preferred polarization state, the refractive index of said filler is substantially lower than the refractive index of said substrate and,
  (b) for the polarization state orthogonal to said preferred polarization state, the refractive index of said filler is substantially the same as the refractive index of said substrate.

The invention also provides similarly described film embodiments, displays incorporating the films and methods of making the films.

The invention provides a film and display that handles polarized light efficiently to enable increased luminance.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
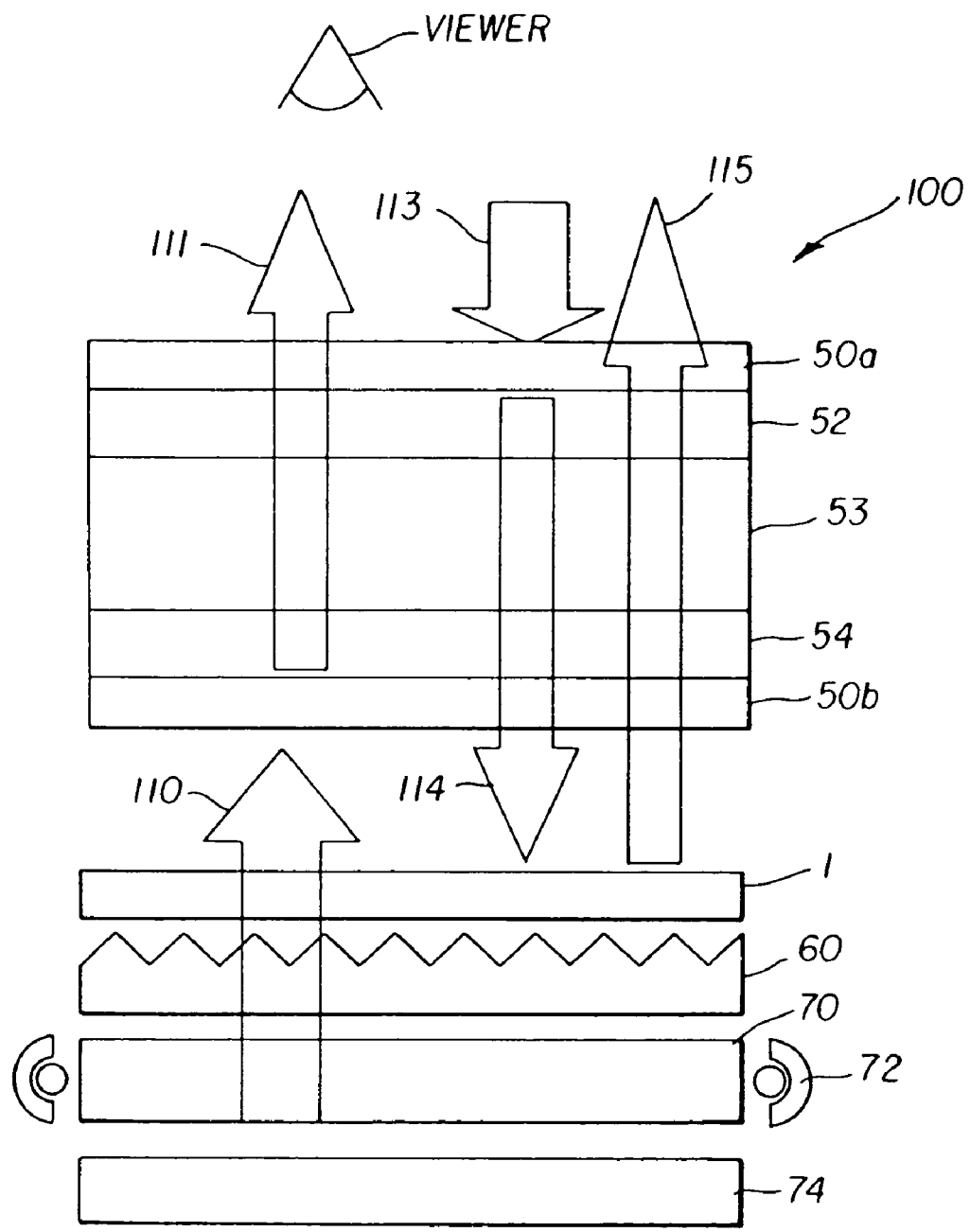
FIG. 1 is a schematic diagram showing, from a cross-sectional side view, an LCD display using a transflective film element.

The invention is summarized above. In one embodiment it includes provides a transflective optical film for reflecting ambient light incident on a first surface and for transmitting light having a preferred polarization state incident on a second surface opposite the first surface, the optical film comprising:
  (a) a substrate containing a plurality of tapered cavities extending from the first surface of said substrate toward the second surface opposite the first surface, said tapered cavities narrowing toward said second surface;
  (b) a filler material deposited within each said tapered cavity; and,
  (c) a reflective material deposited on said filler material on the surface of the filler material adjacent the first surface of said substrate;

wherein at least one of said substrate and said filler material is birefringent such that:
  (a) for said preferred polarization state, the refractive index of said filler is substantially lower than the refractive index of said substrate and,
  (b) for the polarization state orthogonal to said preferred polarization state, the refractive index of said filler is substantially the same as the refractive index of said substrate.

In another embodiment it provides a transflective optical film for reflecting ambient light incident on a first surface and for transmitting light having a preferred polarization state incident on a second surface opposite the first surface, comprising:
  (a) a substrate having a first index of refraction $n_1$, wherein said substrate comprises a plurality of tapered cavities extending from a first surface and narrowing toward the second surface;
  (b) a birefringent filler material deposited within each said tapered cavity, said filler material having a second index of refraction $n_2$ for light having said preferred polarization state and a third index of refraction $n_3$ for light having an orthogonal polarization state to said preferred polarization state; and,
  (c) a reflective layer deposited on the end of said filler material in each said tapered cavity adjacent said first surface;

wherein $n_3$ is substantially equal to $n_1$ and $n_2$ is substantially less than $n_1$.

In a further(embodiment it provides a transflective optical film for reflecting ambient light incident on a first surface and for transmitting light incident on the opposite second surface having a preferred polarization state, the optical film comprising:
  (a) a birefringent substrate having a first index of refraction $n_1$ for light having the preferred polarization state and a second index of refraction $n_2$ for light having the orthogonal polarization state, wherein said substrate comprises a plurality of tapered cavities extending from the first surface and narrowing toward the opposite second surface;
  (b) a filler material deposited within each said tapered cavity, said filler material having a third index of refraction $n_3$; and,
  (c) a reflective layer deposited on said filler material in each said tapered cavity adjacent said first surface;

wherein $n_3$ is substantially equal to $n_1$ and $n_3$ is substantially less than $n_2$.

In a further embodiment, the invention provides an optical film for receiving, on an input first surface, incident illumination from a light source, for transmitting said illumination having a first polarization state and reflecting said illumination having a second polarization state back toward the light source, the optical film comprising:

(a) a reflector for reflecting light incident on the opposite surface;
(b) means for transmitting light incident thereon from a first surface of the film;

such that the sum of the following exceeds about 140 percent of illumination:

(i) light incident on said second surface being reflected relative to the total amount of the light incident on said second surface; plus, (ii) light of the first polarization transmitted from said first surface relative to the amount of light of the first polarization incident on said first surface.

The transmissivity of the optical film along said first direction for light of said first polarization is greater than about 70% relative to the amount of incident light of said first polarization, or the reflectivity of the optical film along said second direction for light of said second polarization is greater than about 70% relative to the amount of incident light of said second polarization.

The invention also provides a display apparatus utilizing both transmitted and ambient illumination, comprising:

(a) a backlight source for providing illumination;
(b) a liquid crystal spatial light modulator for modulating light of a preferred input polarization state to provide modulated light having an output polarization state; and the film above.

Finally, the invention provides method for enhancing luminance of a liquid crystal display comprising:

(a) providing incident illumination from a two-dimensional surface;
(b) transmitting said illumination having a preferred polarization state to the liquid crystal display through a transflective optical film described above.

The present description is directed in particular to elements forming part of, or cooperating more directly with, apparatus in accordance with the invention. It is to be understood that elements not specifically shown or described may take various forms well known to those skilled in the art.

Figure 2:
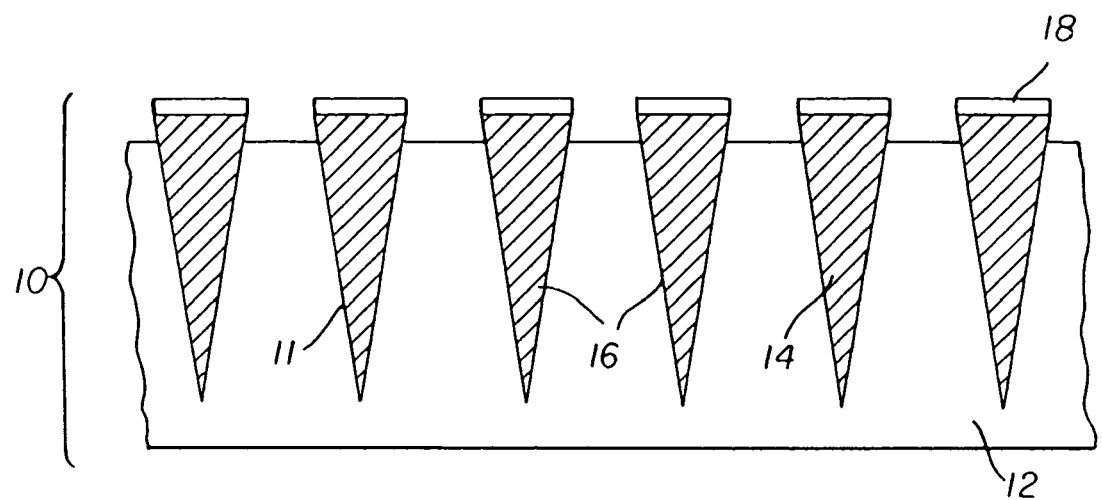
FIG. 2 is a diagram showing, in cross-section, the basic structure of a transflective optical film according to the present invention.

Referring to FIG. 2 there is shown a schematic diagram, from a cross-sectional side view, of a transflective optical film 10 according to the present invention. Transflective optical film 10 comprises a film substrate 12 having an embedded arrangement of tapered structures 16. Each tapered structure 16 is formed by depositing a filler material 14 into a cavity or groove 11 in substrate 12. Tapered structures 16 extend from a surface of film substrate 12 toward the opposite surface, and are narrower as they approach the opposite surface. In a preferred embodiment, filler material 14 is a birefringent material, providing favorable optical properties for handling incident polarized light; in general, at least one of filler material 14 or substrate 12 must be birefringent, as is described subsequently. On the top surface of tapered structure 16, deposited onto the surface of filler material 14 that lies parallel to the surface of substrate 12, is a reflective layer 18. Reflective layer 18 may be formed from any of a number of reflective materials, including metals such as aluminum, nickel, silver, gold, or an alloy or combination of metals with suitable properties, as well as other reflective materials.

Figure 3:
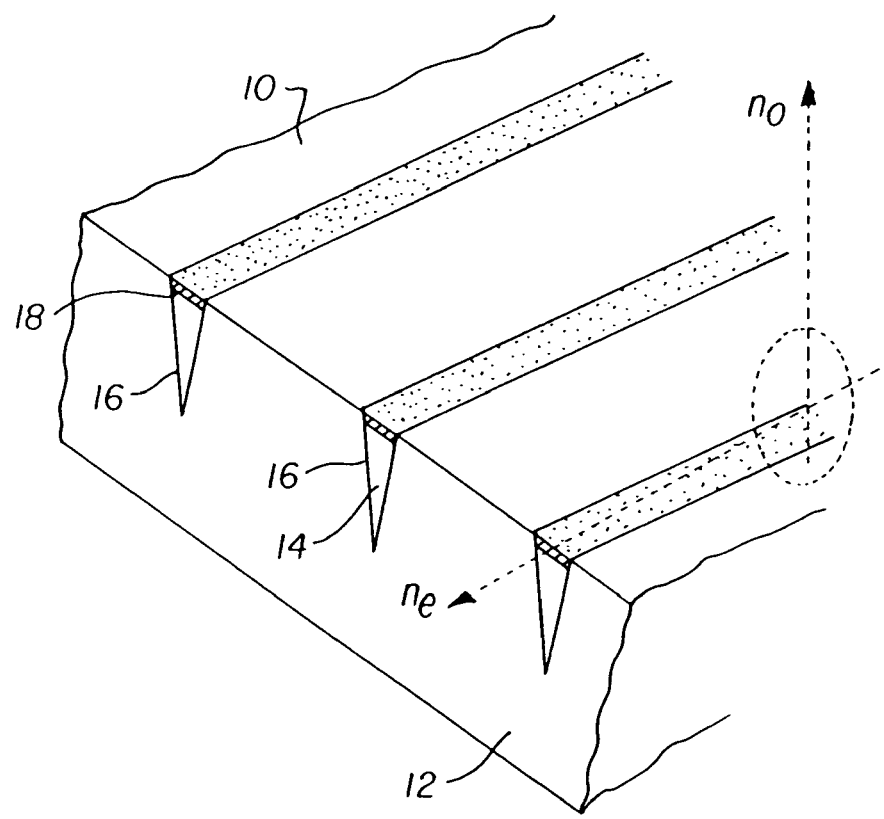
FIG. 3 is a perspective view showing surface structures of the transflective film of the present invention; and, FIG. 4a is a schematic diagram showing, from a cross-sectional side view, a transflective film according to the present invention handling light, from a backlight, of given polarization states in a case where the LCD converts s-polarization into p-polarization.

Referring to FIG. 3, there is shown, in a perspective view, one arrangement of transflective optical film 10 in a preferred embodiment. Here, tapered structures 16 run in parallel in one direction along the surface of substrate 12. However, other arrangements are possible, including an array with rows and columns of individual tapered structures 16. Randomized arrangements could also be used for tapered structures 16. Preferred dimensions and center-to-center pitch for tapered structures 16 would be based on the pixel resolution of the modulating LC device. Typical pixel dimensions are in the 100 micron range; suitable tapered structures 16 in this case would be approximately 20 microns in diameter at the surface of transflective optical film 10, for example. These dimensions are illustrative only and are not intended to be limiting.

Because it is birefringent, filler material 14 presents different refractive indices $n_o$ and $n_e$ to light having different polarization states. Using the representation in FIG. 3, the optical axis, presenting refractive index $n_e$, can be pictured as parallel to groove 11. Index $n_o$ then applies for light in a plane perpendicular to the optical axis $n_e$. This difference in refractive indices $n_o$ and $n_e$ is used to provide different handling of light transmitted through transflective optical film 10 of the present invention, depending on polarization state of the light and depending on the refractive index $n_s$ of substrate 12. For the purposes of this discussion, two indices of refraction $n_1$ and $n_2$ can be considered to be substantially equal if they differ by no more than about 0.01. When indices of refraction $n_1$ and $n_2$ are equal or only slightly different, Total Internal Reflection (TIR) does not occur or occurs only at extreme incident angles relative to normal. To cause TIR over a sufficient range of angles for incident light, indices of refraction $n_1$ and $n_2$ should be substantially different, with the index of refraction of the medium that carries the incident and reflected light exceeding the index of the medium at the TIR interface by at least about 0.01, preferably with a difference of about 0.1 or better in practical embodiments. Since, as is well known in the optical arts, the indices of refraction determine the angle at which TIR occurs, the overall shape of tapered structure 16 or groove 11 and the angles of incident light should be considered for computing the minimum amount of difference that is needed between indices $n_1$ and $n_2$ at the interface of substrate 12 and tapered structure 16. It can be appreciated that the design of transflective optical film 10 must consider and manipulate variables such as desired light angles for TIR, the overall shape of tapered structures 16, and indices of refraction of substrate 12 and filler material 14, in order to obtain the needed behavior for a specific application.

Transmissive Mode Behavior

Figure 4A:
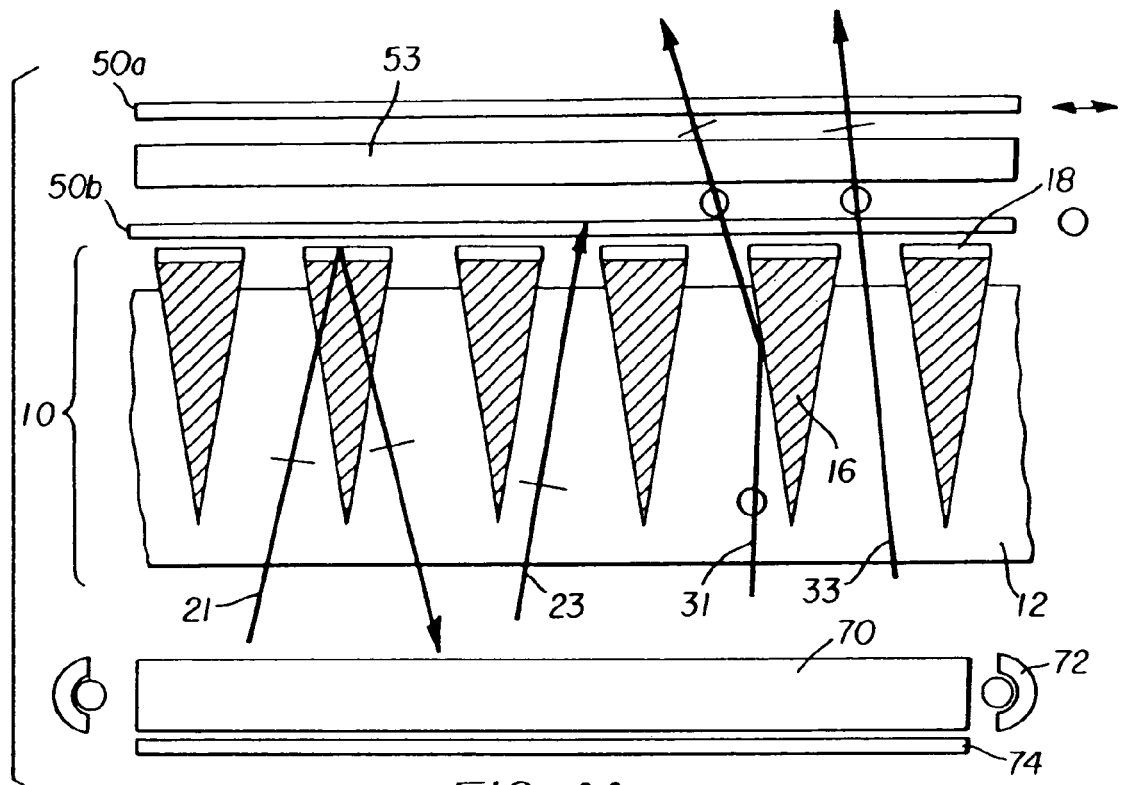
FIG. 4b is a schematic diagram showing, from a cross-sectional side view, a transflective film according to the present invention handling light, from a backlight, of given polarization states in a case where the LCD does not change s-polarization.
Figure 4B:
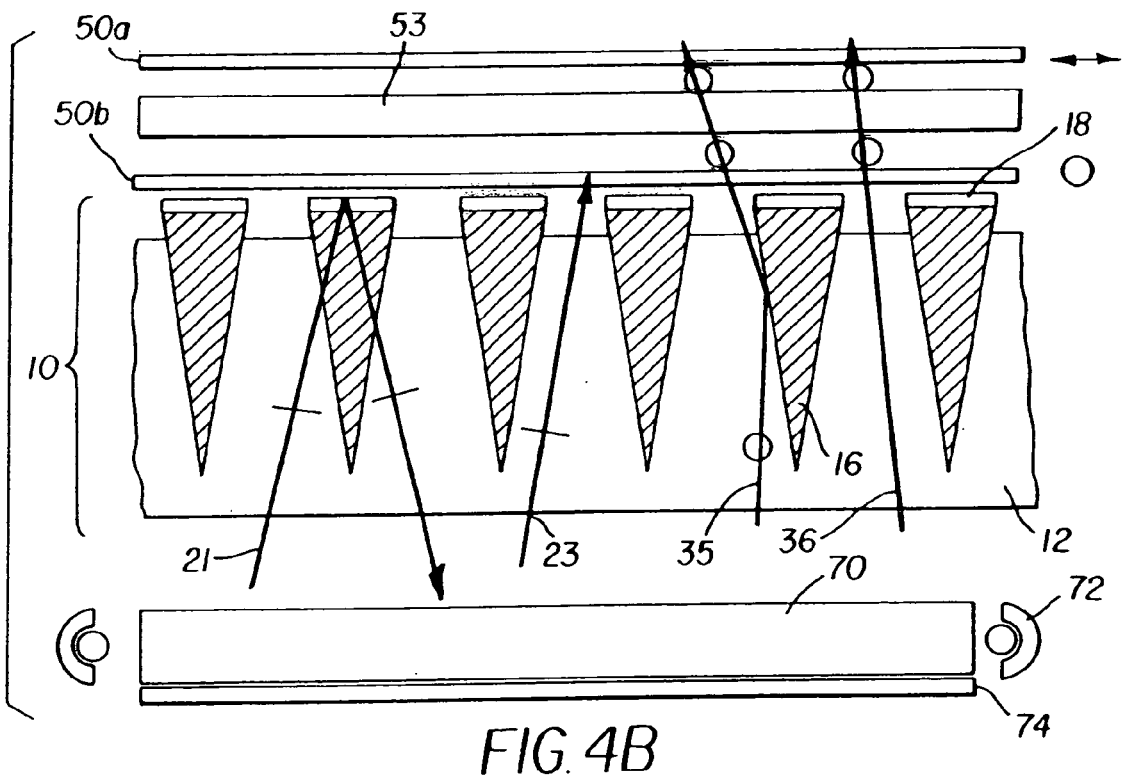

Referring to FIGS. 4a and 4b, there is shown, in a cross-sectional view for an area representing a portion of a pixel, how transflective optical film 10 works with polarizers 50a and 50b and with liquid crystal layer 53 to provide modulated light of the required polarity and to recycle unwanted light of the opposite polarity in a transmissive mode. Polarization states are represented by conventional symbols, with p-polarization shown by a line or arrow and s-polarization by a circle.

Referring first to FIG. 4a, liquid crystal layer 53, using a twisted-nematic (TN) liquid crystal in one embodiment, is in a bright state for this pixel position. In this state, liquid crystal layer 53 converts s-polarization into p-polarization, or converts p-polarization into s-polarization. Lower polarizer 50*b* has the indicated s-polarization transmission state. Light rays 21 and 23 from light guiding layer 70 have the opposite p-polarization state. For the purpose of illustration, two light rays 21 and 23 show the two possible cases for handling light having the unwanted polarization state, as follows:

(i) Unwanted p-polarized light ray 21 is incident on tapered structure 16. Because the index of refraction n in this direction is close to the index of refraction $n_s$ of substrate 12, light ray 21 passes into tapered structure 16 and is reflected from reflective layer 18. This p-polarized light, reflected back by reflective layer 18, can be recycled, due to the diffusive properties of light-guiding layer 70 or other polarization conversion means. Some portion of this light is changed in polarization state to become s-polarized and can be re-used;

(ii) Unwanted p-polarized light ray 23 is absorbed by rear polarizer 50*b*.

Still referring to FIG. 4*a*, light rays 31 and 33 from light guiding layer 70 have an s-polarization state. For the purpose of illustration, light rays 31 and 33 show the two possible cases for handling light having the desired polarization state for modulation by liquid crystal layer 53, as follows:

(i) Desired s-polarized light ray 31 is incident on tapered structure 16. Because the index of refraction n in this direction is substantially less than the index of refraction $n_s$ of substrate 12, Total Internal Reflection (TIR) occurs at the interface of tapered structure 16, reflecting light ray 31 through rear polarizer 50*b* and toward liquid crystal layer 53 for modulation;

(ii) Desired s-polarized light ray 33 simply passes through rear polarizer 50*b* and toward liquid crystal layer 53 for modulation.

Turning now to FIG. 4*b*, liquid crystal layer 53 is in the opposite state from FIG. 4*a*, that is, in a dark state for a pixel position. Here, liquid crystal layer 53 does not change the polarization state of the light. For the purpose of illustration, light rays 21 and 23 show the two possible cases for handling light having the unwanted polarization state, exhibiting the same behavior described above with reference to FIG. 4*a*. Light rays 35 and 36 show the two possible cases for handling light having the desired polarization state for the dark pixel state of FIG. 4*b*, as follows:

(i) Desired s-polarized light ray 35 is incident on tapered structure 16. Because the index of refraction n of tapered structure 16 in this direction is substantially less than the index of refraction $n_s$ of substrate 12, Total Internal Reflection (TIR) occurs at the interface of tapered structure 16, reflecting light ray 35 through rear polarizer 50*b* and, unmodulated, through liquid crystal layer 53. Front polarizer 50*a* then absorbs light ray 35, to maintain a dark pixel;

(ii) Desired s-polarized light ray 36 simply passes through rear polarizer 50*b* and, unmodulated, through liquid crystal layer 53. Front polarizer 50*a* then absorbs light ray 36, to maintain a dark pixel.

Reflective Mode Behavior

Figure 5A:
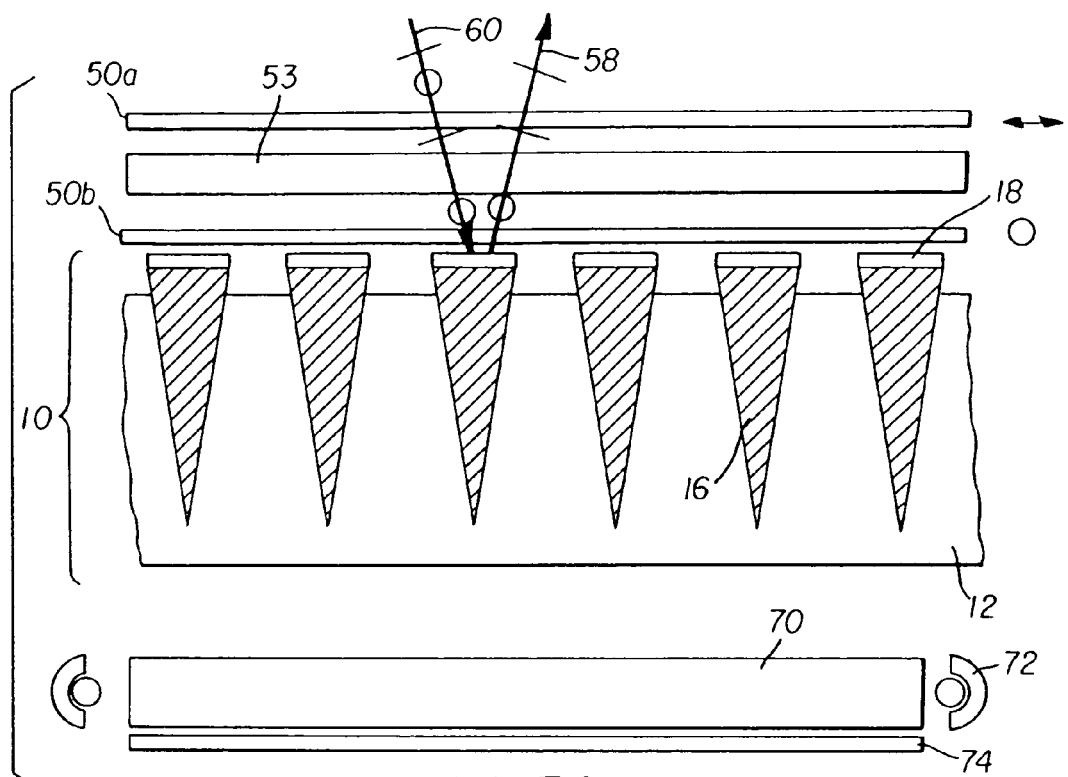
FIG. 5a is a schematic diagram showing, from a cross-sectional side view, a transflective film according to the present invention handling ambient light of given polarization states in a case where the LCD changes polarization.
Figure 5B:
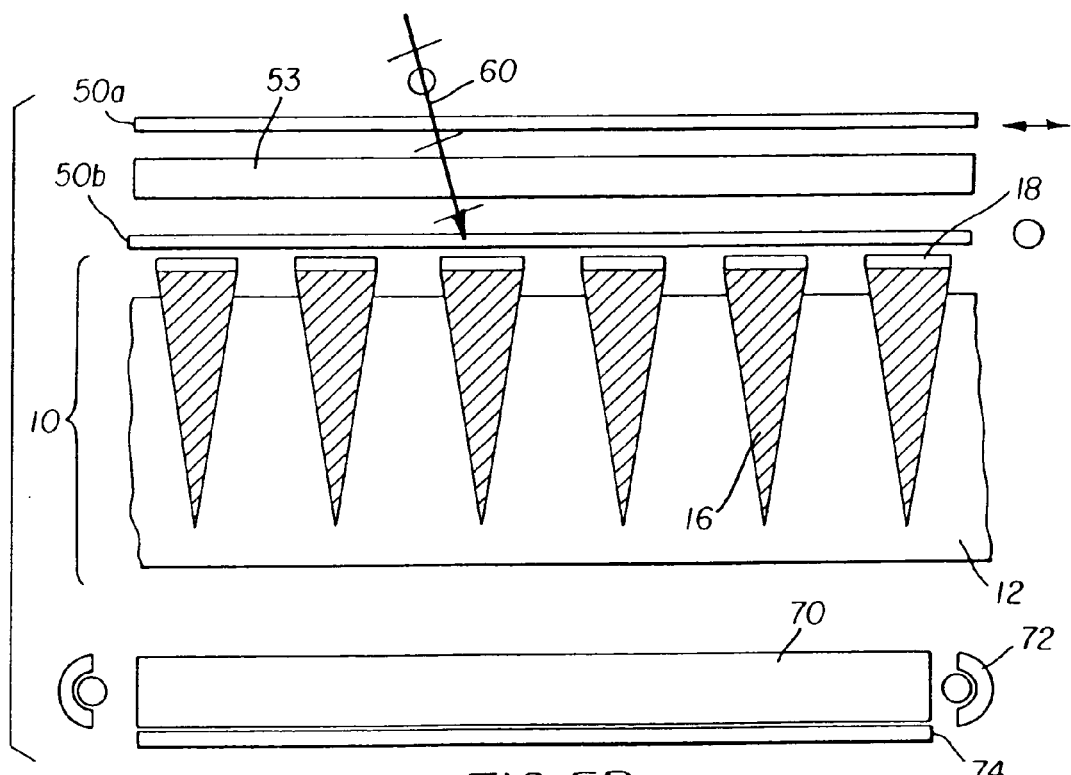
FIG. 5b is a schematic diagram showing, from a cross-sectional side view, a transflective film according to the present invention handling ambient light of given polarization states in a case where the LCD does not change polarization; and, FIG. 6 is a schematic diagram of a display using the transflective film of the present invention.

Referring to FIGS. 5*a* and 5*b*, there is shown, in a cross-sectional view for an area representing a portion of a pixel, how transflective optical film 10 works with polarizers 50*a* and 50*b* and with liquid crystal layer 53 to provide modulated light of the required polarity in a reflective mode.

Referring first to FIG. 5*a*, liquid crystal layer 53 is in a bright state at this pixel position. In this state, liquid crystal layer 53 converts s-polarization into p-polarization, or p-polarization into s-polarization. Upper polarizer 50*a* has the indicated p-polarization transmission state, transmitting only the p-polarized light component of unpolarized ambient light ray 60. Liquid crystal layer 53 rotates the p-polarized light to provide s-polarized light through rear polarizer 50*b* and to reflective layer 18. This s-polarized light reflected from reflective layer 18 is transmitted back through rear polarizer 50*b* and is again modulated, changing its polarization from s- back to p-polarization. This component of the ambient light is transmitted through front polarizer 50*a*, emerging as a light ray 58, to provide a bright pixel.

FIG. 5*b* shows the behavior of transflective optical film 10 for ambient light when liquid crystal layer 53 is in the opposite, dark state at this pixel position. Again, upper polarizer 50*a* transmits only the p-polarized light component of unpolarized ambient light ray 60. Liquid crystal layer 53 passes this p-polarized light to rear polarizer 50*b*, which merely absorbs this unwanted light, maintaining a dark pixel.

Figure 6:
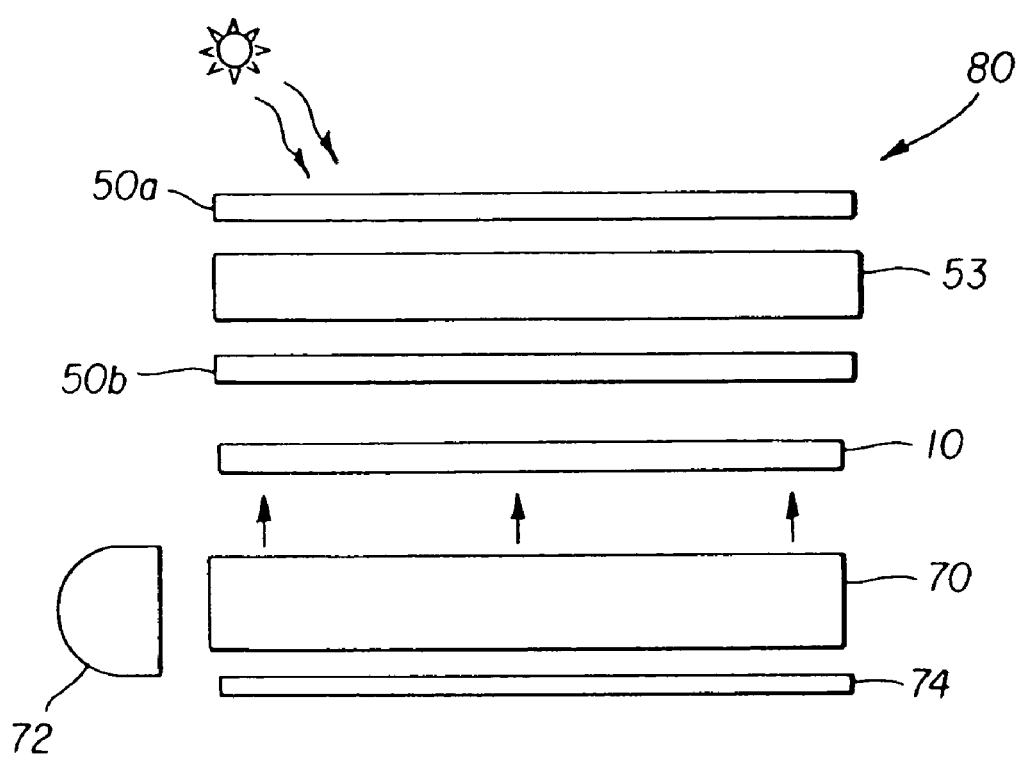

Referring to FIG. 6, there is shown an LC display 80 using transflective optical film 10 as its transflective component for allowing ambient light to be combined with illumination from light guiding layer 70. In performance, transflective optical film 10 of the present invention compares favorably with prior art transflective devices, such as that disclosed in the above-cited Clikeman et al. '220 disclosure, for example. In reflective mode, for example, the overall light efficiency for transflective optical film 10 of the present invention is the essentially the same as would be available from a film using the reflective structures disclosed in the Clikeman et al. '220 patent. In transmissive mode, however, transflective optical film 10 of the present invention is advantaged over prior art transflective films. By recycling light having the unwanted polarization state, as was described hereinabove with reference to FIG. 4*a*, transflective optical film 10 of the present invention is able to provide as much as 30% or more transmitted light than is available using prior art solutions.

In order to recycle light having the unwanted polarization state, it is necessary that light guiding layer 70 incorporate or cooperate with components that provide some level of diffusion or retardation of reflected light. Light guiding layer 70 may have diffusive properties or be provided with a separate diffuser, a quarter-wave plate, or other suitable component for rotating the polarization state of at least some portion of the reflected light.

It must be observed that the schematic diagrams of FIGS. 4*a*, 4*b*, 5*a*, and 5*b*, and the accompanying description, are somewhat simplified in order to illustrate the basic concept. For example, achieving acceptable contrast levels is important for the design of a suitable LC display 80. High contrast requires good extinction ratio between modulated light of desired polarization and leakage light of unwanted polarization.

The schematic diagrams of FIGS. 4*a*, 4*b*, 5*a*, and 5*b* and accompanying descriptions showed an LC display that provides p-polarized light output. Certainly, the opposite polarization states could be used, with corresponding changes to signs, as is well known in the optical arts.

The principle of operation of transflective optical film 10 of the present invention is based on birefringence and relative indices of refraction at the interface between tapered structures 16 and substrate 12. For the desired polarization state, the corresponding refractive indices of tapered structures 16 and substrate 12 must differ sufficiently to cause TIR, with the refractive index of substrate 12 greater than that of filler material 14. To provide this, either or both tapered structures 16 and substrate 12 could be birefringent. Thus, in an alternate embodiment, for example, substrate 12 could be birefringent, with tapered structure 16 having a single index of refraction. Alternately, both substrate 12 and tapered structure 16 could be birefringent, provided that the interface between substrate 12 and tapered structure 16 provides TIR behavior for light having the desired polarization state.

In an example embodiment, tapered structure 16 is birefringent, with the following indices of refraction for filler material 14:

$n_o = 1.7$
$n_e = 1.5$

Substrate 12 has a single index of refraction, $n_s = 1.7$.

For this example, light polarized in the $n_o$ direction passes through the interface between substrate 12 and tapered structure 16. Light in the $n_e$ direction, on the other hand, undergoes TIR at suitable angles.

In a second example, both substrate 12 and tapered structure 16 exhibit birefringence, with the following values:

Tapered structure 16 $n_o = 1.7$
Tapered structure 16 $n_e = 1.5$
Substrate 12 $n_{s_o} = 1.7$
Substrate 12 $n_{s_e} = 1.8$ Here, light polarized in the $n_o$ direction is transmitted through the interface. Light polarized in the $n_e$ direction undergoes TIR.

Unlike prior art transflective films, transflective optical film 10 of the present invention is designed to handle the polarized light needed by LCDs, boosting the transmitted component of this light, as was noted hereinabove. Transflective optical film 10 of the present invention increases the overall light available for display, allowing an LCD device to use both backlighting and ambient lighting to achieve improved display brightness.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, a wide range of transparent substrate and birefringent filler materials 14 could be used. Typical transparent substrate materials include polycarbonate, polymethyl methacrylate (PMMA) or polyethylene naphthalate (PEN), for example. The selection of suitable indices of refraction allows various combinations to allow transmission and reflection of light having different polarization states. Tapered structures 16 could be formed in grooved cavities, as was shown in FIG. 3 or could be formed as an array of cones or other discrete, tapered shapes. Grooved cavities 11 could be arranged in parallel or in a pattern such as a honeycomb pattern, or in a randomized distribution. The dimensions, internal angles, and pitch of tapered structures 16 must be determined based on factors such as needed light angles and relative indices of refraction. Tapered structures 16 could be of different pitch and dimensions along a single piece of transflective optical film 10, for optimizing the handling of polarized light from light-guiding layer 70. Liquid crystal layer 53 could be a twisted-nematic (TN) type or other suitable type of light modulator.

Thus, what is provided is a transflective optical film optimized for handling polarized light, reflecting ambient light and transmitting source light of the proper polarization state and re-cycling source light of the unwanted polarization state for re-use of a portion of that light.

It is a feature of embodiments of the transflective film of the present invention that they may selectively transmit or reflect light from a backlight source based on the polarization state so that the present invention offers increased efficiency over prior art transflective optical film designs when used with polarization modulators such as LCD spatial light modulators.

It is a further advantage of embodiments of the present invention that they provide additional gain for transmitted light, above that available with prior art transflective films.

The entire contents of the patents and other publications referred to in this specification are incorporated herein by reference.

PARTS LIST

1 Transflective surface
10 Transflective optical film
11 Groove
12 Substrate
14 Filler material
16 Tapered structure
18 Reflective layer
50a, 50b Polarizer
52, 54 Glass plates
53 Liquid crystal layer
70 Light-guiding layer
72 Light source
74 Reflective surface
80 LC display
100 LCD display configuration
21, 23, 31, 33, 35, 37, 39, 56, 58, 60, 62, 110, 111, 113, 114, 115 Light rays

What is claimed is:

1. A transflective optical film for reflecting ambient light incident on a first surface and for transmitting light having a preferred polarization state incident on a second surface opposite the first surface, the optical film comprising:
   (a) a substrate containing a plurality of tapered cavities extending from the first surface of said substrate toward the second surface opposite the first surface, said tapered cavities narrowing toward said second surface;
   (b) a filler material deposited within each said tapered cavity; and,
   (c) a reflective material deposited on said filler material on the surface of the filler material adjacent the first surface of said substrate;
wherein at least one of said substrate and said filler material is birefringent such that:
   (a) for said preferred polarization state, the refractive index of said filler is substantially lower than the refractive index of said substrate and,
   (b) for the polarization state orthogonal to said preferred polarization state, the refractive index of said filler is substantially the same as the refractive index of said substrate.

2. A transflective optical film according to claim 1 wherein said filler material is birefringent.

3. A transflective optical film according to claim 1 wherein said substrate is birefringent.

4. A transflective optical film according to claim 1 wherein both substrate and filler material are birefringent.

5. A transflective optical film according to claim 1 wherein said tapered cavities are arranged as a series of elongated triangles extended in parallel along said first surface.

6. A transflective optical film according to claim 1 wherein said tapered cavities are arranged in a honeycomb pattern along said first surface.

7. A transflective optical film according to claim 1 wherein said tapered cavities are arranged in a random pattern along said first surface.

8. A transflective optical film according to claim 1 wherein said reflective layer comprises a material that is selected from the group consisting of aluminum, nickel, silver, gold, or combinations of two or more metals.

9. A transflective optical film according to claim 1 wherein said reflective layer comprises a plurality of dielectric layers.

10. A transflective optical film for reflecting ambient light incident on a first surface and for transmitting light having a preferred polarization state incident on a second surface opposite the first surface, comprising:
    (a) a substrate having a first index of refraction $n_1$, wherein said substrate comprises a plurality of tapered cavities extending from a first surface and narrowing toward the second surface;
    (b) a birefringent filler material deposited within each said tapered cavity, said filler material having a second index of refraction $n_2$ for light having said preferred polarization state and a third index of refraction $n_3$ for light having an orthogonal polarization state to said preferred polarization state; and,
    (c) a reflective layer deposited on the end of said filler material in each said tapered cavity adjacent said first surface;
wherein $n_3$ is substantially equal to $n_1$ and $n_2$ is substantially less than $n_1$.

11. A transflective optical film according to claim 10 wherein $n_1$ differs from $n_2$ by more than about 0.01.

12. A transflective optical film according to claim 10 wherein $n_1$ differs from $n_3$ by less than about 0.01.

13. A transflective optical film according to claim 10 wherein said substrate is birefringent.

14. A transflective optical film according to claim 10 wherein said tapered cavities are arranged as a series of elongated triangles extended in parallel along said first surface.

15. A transflective optical film according to claim 10 wherein said tapered cavities are arranged in a honeycomb pattern along said first surface.

16. A transflective optical film according to claim 10 wherein said tapered cavities are arranged in a random pattern along said first surface.

17. A transflective optical film according to claim 10 wherein said reflective layer comprises a material that is selected from the group consisting of aluminum, nickel, silver, gold, or combinations of two or more metals.

18. A transflective optical film according to claim 10 wherein said reflective layer comprises a plurality of dielectric layers.

19. A transflective optical film for reflecting ambient light incident on a first surface and for transmitting light incident on the opposite second surface having a preferred polarization state, the optical film comprising:
    (a) a birefringent substrate having a first index of refraction $n_1$ for light having the preferred polarization state and a second index of refraction $n_2$ for light having the orthogonal polarization state, wherein said substrate comprises a plurality of tapered cavities extending from the first surface and narrowing toward the opposite second surface;
    (b) a filler material deposited within each said tapered cavity, said filler material having a third index of refraction $n_3$; and,
    (c) a reflective layer deposited on said filler material in each said tapered cavity adjacent said first surface;
wherein $n_3$ is substantially equal to $n_1$ and $n_3$ is substantially less than $n_2$.

20. A transflective optical film according to claim 19 wherein $n_2$ differs from $n_3$ by more than about 0.01.

21. A transflective optical film according to claim 19 wherein $n_1$ differs from $n_3$ by less than about 0.01.

22. A transflective optical film according to claim 19 wherein said filler material is birefringent.

23. A transflective optical film according to claim 19 wherein said tapered cavities are arranged as a series of elongated triangles extended in parallel along said first surface.

24. A transflective optical film according to claim 19 wherein said tapered cavities are arranged in a honeycomb pattern along said first surface.

25. A transflective optical film according to claim 19 wherein said tapered cavities are arranged in a random pattern along said first surface.

26. A transflective optical film according to claim 19 wherein said reflective layer is selected from the group consisting of aluminum, nickel, silver, gold, or combinations of two or more metals.

27. A transflective optical film according to claim 19 wherein said reflective layer comprises a plurality of dielectric layers.

28. A display apparatus utilizing both transmitted and ambient illumination, comprising:
    (a) a backlight source for providing illumination;
    (b) a liquid crystal spatial light modulator for modulating light of a preferred input polarization state to provide modulated light having an output polarization state; and
    (c) the transflective optical film of claim 1.

29. A method for enhancing luminance of a liquid crystal display comprising:
    (a) providing incident illumination from a two-dimensional surface;
    (b) transmitting said illumination having a preferred polarization state to the liquid crystal display through a transflective optical film of claim 1.

30. A method for forming a transflective optical film for reflecting ambient light incident on a first surface and for transmitting light incident on the opposite surface having a preferred polarization state, the method comprising:
    (a) forming a plurality of tapered cavities into the first surface of a film substrate, said film substrate having a first index of refraction $n_1$;
    (b) depositing a birefringent filler material within each said tapered cavity, said filler material having a second index of refraction $n_2$ in a first direction and a third index of refraction $n_3$ in a second direction orthogonal to said first direction; and,
    (c) depositing a reflective layer onto said filler material along said first surface in each said tapered cavity.

31. A method for forming a transflective optical film according to claim 30 wherein the step of forming a plurality of tapered cavities comprises the step of forming a series of parallel grooves.

* * * * *